United States Patent
Salonidis et al.

(10) Patent No.: US 9,125,097 B2
(45) Date of Patent: Sep. 1, 2015

(54) METHOD FOR CHANNEL STATE MEASUREMENT IN MULTI-MODE MULTI-HOP WIRELESS NETWORKS

(75) Inventors: Theodoros Salonidis, Paris (FR); Anand Prabhu Subramanian, New Providence, NJ (US); Henrik Lundgren, Le Plessis Robinson (FR); Don Towsley, Amherst, MA (US)

(73) Assignee: Thomson Licensing, Issy-les-Moulineaux (FR)

( * ) Notice: Subject to any disclaimer, the term of this patent is extended or adjusted under 35 U.S.C. 154(b) by 142 days.

(21) Appl. No.: 13/500,507

(22) PCT Filed: Oct. 8, 2010

(86) PCT No.: PCT/EP2010/065117
§ 371 (c)(1),
(2), (4) Date: Apr. 5, 2012

(87) PCT Pub. No.: WO2011/042546
PCT Pub. Date: Apr. 14, 2011

(65) Prior Publication Data
US 2012/0195225 A1 Aug. 2, 2012

(30) Foreign Application Priority Data
Oct. 8, 2009 (EP) .................................... 09305955

(51) Int. Cl.
*H04L 1/00* (2006.01)
*H04W 24/10* (2009.01)
*H04W 88/06* (2009.01)

(52) U.S. Cl.
CPC .............. *H04W 24/10* (2013.01); *H04W 88/06* (2013.01)

(58) Field of Classification Search
CPC ........ H04W 24/00; H04W 4/00; H04L 12/26; H04L 12/28; H04J 3/06; H04J 3/00; H04B 7/212; G06F 11/00; G06F 15/16; H03M 13/00
USPC ................ 370/230, 241, 242, 252–258, 312, 370/321–337, 345, 350, 356, 445, 503; 455/423, 500, 561; 709/242, 209, 248
See application file for complete search history.

(56) References Cited

U.S. PATENT DOCUMENTS
2003/0231715 A1   12/2003   Shoemake et al.
(Continued)

FOREIGN PATENT DOCUMENTS
CN   1964261   5/2007
(Continued)

OTHER PUBLICATIONS
Search Rept: Nov. 10, 2010.
(Continued)

*Primary Examiner* — Jamal Javaid
*Assistant Examiner* — Walli Butt
(74) *Attorney, Agent, or Firm* — Myers Wolin LLC

(57) ABSTRACT

The invention concerns a method for measuring channel state information of multiple transmission/reception modes in a wireless network comprising a plurality of nodes, said modes being defined by frequency channels and/or antenna patterns, said wireless network comprising a MAC (Media Access Control) layer and every node comprising at least one MAC queue, comprising the steps of:periodically sending broadcast probe packets by at least one node called transmitter node, using a pre-determined and globally known period and predetermined sequence of transmission modes, each of said probe packets containing the transmission mode used for its transmission a sequence number of the transmission mode in the pre-determined sequence of transmission modes and a timestamp value containing the time said broadcast probe packet was buffered at the MAC queue of the transmitter node; measuring, by at least one second node called receiving node receiving a broadcast probe packet , channel state information of a transmission/reception mode for the link between the transmitter node and the receiving node; storing, by said receiving node, said measured transmission/reception mode for said link; using information contained in said received broadcast probe packet, by said receiving node to determine its reception mode and the beginning and end time instants it will use this reception mode, in order to receive a further broadcast probe packet and measure the next transmission mode of transmitter node, during a next measurement period of transmitter node.

24 Claims, 2 Drawing Sheets

(56) References Cited

U.S. PATENT DOCUMENTS

| | | | |
|---|---|---|---|
| 2004/0137924 | A1 | 7/2004 | Herscovich et al. |
| 2006/0079220 | A1* | 4/2006 | Cha et al. .................... 455/423 |
| 2006/0165008 | A1* | 7/2006 | Li et al. ........................ 370/252 |
| 2007/0072600 | A1 | 3/2007 | Cho et al. |
| 2007/0110093 | A1 | 5/2007 | Tang |
| 2008/0040509 | A1* | 2/2008 | Werb et al. .................... 709/242 |
| 2009/0103501 | A1* | 4/2009 | Farrag et al. .................. 370/337 |
| 2009/0122709 | A1* | 5/2009 | Voglewede et al. ........... 370/241 |
| 2009/0279487 | A1* | 11/2009 | Reumerman et al. ......... 370/329 |
| 2009/0303888 | A1* | 12/2009 | Ariyur et al. .................. 370/252 |
| 2010/0027524 | A1* | 2/2010 | Santos Barreto ............. 370/345 |
| 2011/0110340 | A1* | 5/2011 | Lakkis .......................... 370/336 |
| 2012/0106522 | A1* | 5/2012 | Reumerman et al. ......... 370/337 |

FOREIGN PATENT DOCUMENTS

| | | |
|---|---|---|
| CN | 101102578 | 1/2008 |
| KR | 1020070001417 | 1/2007 |
| WO | WO02/19740 | 3/2002 |
| WO | WO2004023668 | 3/2004 |
| WO | WO2006/034194 | 3/2006 |
| WO | WO2007082281 | 7/2007 |

OTHER PUBLICATIONS

Aguayo et al. "Link-level Measurements from an 802.11b Mesh Network", Proceedings ACMSIGCOMM, Portland, OR, Aug. 2005.

Chang et al. "Optimal Channel Probing and Transmission Scheduling for Opportunistic Spectrum Access" IEEE/ACM Transactions on Networking, vol. 17, No. 6, Dec. 2009.

Gopalan et al. "On wireless scheduling with partial channel-state information", Proceedings of the 45th Allerton Conference on Communication Control and Computing, Urbana, IL., Jan. 2007.

Guha et al. "Optimizing transmission rate in wireless channels using adaptive probes", Proceedings of SIGMETRICS/Perfomance, Jan. 2006.

Li et al. "Energy-Optimal Scheduling with Dynamic Channel Acquisition in Wireless Downlinks", Proceedings of 46th IEEE Conference on Decision and Control, Dec. 2007.

Li et al. "Predictable Performance Optimization for Wireless Networks", Proceedings ACM SIGCOMM, Seattle, WA, USA, Aug. 2008.

Ahmed et al. "Online Estimation of RF Interference", Proceedings ACM CoNEXt, Madrid, Spain, Dec. 2008.

Padhye et al. "Estimation of Link Interference in Static Multi-hop Wireless Networks" Oct. 2005, Proceedings ACM Internet Measurement Conference, IMC Berkley, CA, USA.

Sabharwal et al. "Opportunistic Spectral Usage: Bounds and a Multi-Band CSMA/CA Protocol", IEEE/ACM Transactions on Networking, vol. 15 No. 3, Jun. 2007.

Shang, et al., "A low overhead multi-hop time-sync protocol for wireless sensor networks", IEEE 2005 Proc. of Networking, Sensing and Control, Mar. 19-22, 2005, pp. 54-59.

\* cited by examiner

METHOD FOR CHANNEL STATE MEASUREMENT IN MULTI-MODE MULTI-HOP WIRELESS NETWORKS

FIELD OF THE INVENTION

The present invention pertains to the field of communication networks.

The present invention more particularly relates to a method for channel state measurement in multi-mode multi-hop wireless networks.

BACKGROUND OF THE INVENTION

The present invention introduces a distributed protocol for measurement of the channel state information of multiple transmission/reception (Tx/Rx) modes (defined by frequency channels or antenna patterns) on all wireless links in a multi-hop wireless network. The protocol does not need to be integrated with the Medium Access Control (MAC) protocol but can operate at a higher layer (e.g. network layer) of the OSI protocol stack. This makes the protocol general and independent of the wireless technology being used.

Currently there exist no solutions that address the wireless channel state measurement problem in a general multi-mode, multi-hop wireless network environment.

Channel state measurement mechanisms for cellular networks are centralized and perform measurements on individual links of a star topology (between a single base station and multiple mobile terminals) and on a single mode (fixed frequency channel and antenna pattern) after resources have been allocated to a link. Furthermore, channel state measurements are typically integrated with the MAC protocol and are specific to the wireless technology being used. Recent research has focused on channel state measurement algorithms for multi-channel wireless systems (S. Guha, K. Muagala, and S. Sarkar, "*Optimizing transmission rate in wireless channels using adaptive probes*", in Proceedings of SIGMETRICS/Perfrormance, 2006.-A.~Sabharwal and A.~Khoshnevis and E.~Knightly, "*Opportunistic Spectral Usage: Bounds and a Multi-Band {CSMA/CA} Protocol*", IEEE/ACM Transactions on Networking, June, 2007.-N. Chang and M. Liu, "*Optimal channel probing and transmission scheduling for opportunistic spectrum access*", in Proceedings of ACM International Conference on Mobile Computing and Networking (MobiCom), Montreal, Canada, 2007.-A. Gopalan, C. Caramanis, and S. Shakkotai, "*On wireless scheduling with partial channel-state information*", in Proceedings of the 45th Allerton Conference on Communication, Control and Computing, Urbana, Ill., 2007.-C. Li and M. J. Neely, "*Energy-optimal scheduling with dynamic channel acquisition in wireless downlinks*", in Proceedings of 46th IEEE Conference on Decision and Control, 2007.) These papers again focus on the star topology case where a single transmitter (base station) needs to acquire channel state information of a number of time varying channels. These techniques cannot be applied to distributed multi-hop wireless networks. In addition, they only focus on algorithmic aspects such as formulating optimal probing policies rather than specifying protocols that can realize such policies.

IEEE 802.11-based wireless networks can operate in both star-topology (WLAN) and distributed multi-hop ("mesh") configurations. Such networks implement channel state acquisition at the network layer (above the 802.11 MAC) by sending broadcast probe packets that measure Received Signal Strength (RSS) at each receiver. The following References: J. Padhye, S. Agarwal, V. Padmanabhan, L. Qiu, A. Rao, and B. Zill. "*Estimation of Link Interference in Static Multi-hop Wireless Networks*." In Proc. ACM Internet Measurement Conference (IMC), Berkeley, Calif., USA, October 2005.-D. Aguayo, J. Bicket, S. Biswas, G. Judd, and R. Morris. "*Link-level Measurements from an 802.11b Mesh Network*." In Proc. ACM SIGCOMM, Portland, Oreg., August 2004.-N. Ahmed, U. Ismail, S. Keshav, and D. Papagiannaki. "*Online Estimation of RF Interference*." In Proc. ACM CoNEXT, Madrid, Spain, December 2008.-Y. Li, L. Qiu, Y. Zhang, R. Mahajan, and E. Rozner. "Predictable Performance Optimization for Wireless Networks." In Proc. ACM SIGCOMM, Seattle, Wash., USA, August 2008. (other references therein) specify channel state acquisition mechanisms for 802.11 multi-hop mesh networks where N nodes send broadcast probe packets sequentially in N cycles. During each cycle a single node sends several broadcast probe packets while the rest of the nodes listen. This results in measuring the channel state (RSS) of all links in the network using O(N) measurements. However, these solutions are specific to single-mode channel state measurements which use transmissions on a single frequency channel and only use omni-mode for antenna transmission. In multi-mode wireless networks, nodes need to coordinate to tune on the same Tx-Rx mode at the same time instant, which makes the channel state measurement problem much harder.

SUMMARY OF THE INVENTION

The present invention aims at solving the above-mentioned drawbacks of the prior art solutions.

The present invention seeks to solve the channel state measurement problem in multi-mode, multi-hop wireless networks by introducing a protocol that coordinates the nodes to transmit and receive on the right time on all Tx/Rx modes on all links in the network. Currently there exist no solutions that address the wireless channel state measurement problem in a general multi-mode, multi-hop wireless network environment. Existing solutions either operate on individual links of star topologies between base station and mobile terminals or they operate in single-mode (single-channel and omni-antenna patterns) in IEEE 802.11-based single-hop/multi-hop wireless networks. In both cases, the problem of channel state measurement does not require nodes to coordinate their transmissions and receptions in time and on Tx/Rx modes.

In the present invention, the inventors have addressed the problem of measurement in a wireless network using multiple Tx/Rx modes. Each mode can be defined as (i) an antenna pattern formed by smart antennas at the transmitter and receiver of each link (ii) a distinct frequency channel in a multi-channel wireless network.

First, an algorithm is introduced: this algorithm assumes all nodes are synchronized to transmit and receive on each Tx/Rx mode. This algorithm can be implemented at the MAC layer if the MAC protocol (e.g. TDMA) supports time synchronization at short time scales (e.g. micro-second).

Second, a distributed measurement protocol is introduced: this protocol can be implemented on top of any MAC protocol, including the IEEE 802.11 CSMA MAC protocol. According to this protocol, each node acts both as Transmitter and as Receiver. As Transmitter, the node periodically sends broadcast probe packets based on a globally known sequence of all Tx modes. Each probe packet contains the Tx mode used for its transmission. As Receiver, the node tunes to an Rx mode and coordinates to receive during the Tx mode transmission times of its neighbors. The coordination mechanism ensures that the transmission delays of the probe packets and the random delays introduced by the MAC protocol are taken into account. Based on the Tx mode in each received probe packet, the node measures and stores the resulting Tx-Rx mode for the corresponding link. In contrast to using a fixed Tx mode sequence as Transmitter, as Receiver the node dynamically changes Rx modes based on the Tx modes seen in previous probe packets of its neighbors.

The measurement protocol according to the present invention can be implemented at higher layers of the OSI network protocol stack than the MAC layer and is independent of wireless technology being used. Therefore, it is widely applicable. For example, it can be readily implemented using commodity IEEE 802.11 wireless hardware.

Finally, in addition to the protocol, and in case where the system supports a large number of Tx/Rx modes, the inventors also propose methods to reduce measurement complexity by reducing the number of modes that need to be measured.

The present invention is defined, in its broader sense, as a method for measuring channel state information of multiple transmission/reception modes in a wireless network comprising a plurality of nodes, said transmission/reception modes being defined by frequency channels and/or antenna patterns, said wireless network comprising a MAC (Media Access Control) layer and every node comprising at least one MAC queue, comprising the steps of:
  periodically sending broadcast probe packets by at least one node called transmitter node (u), using a pre-determined and globally known period and predetermined and globally known sequence of transmission modes, each of said probe packets containing
    (i) the transmission mode used for its transmission;
    (ii) a sequence number of the transmission mode in the pre-determined sequence of transmission modes; and
    (iii) a timestamp value containing the time at which said broadcast probe packet was buffered at the MAC queue of the transmitter node (u);
  measuring, by at least one second node called receiving node (v) receiving a broadcast probe packet, channel state information of a transmission/reception mode for a link connecting the transmitter node (u) and the receiving node (v);
  storing, by said receiving node (v), said measured transmission/reception mode for said link;
  using information contained in said received broadcast probe packet, by said receiving node (v), to determine
    (i) the reception mode of said receiving node (v); and
    (ii) the start and end time between which said receiving node (v) will use said reception mode in order to receive a further broadcast probe packet from said transmitter node (u) during a next measurement period of transmitter node (u).

Preferably, every node acts both as a receiving node and a transmitter node, transmitting a broadcast probe packet in a transmission mode and receiving at least one broadcast probe packet in at least one reception mode from its neighboring nodes during a measurement period.

According to another embodiment, said channel state information is Signal-to-Noise ratio.

Preferably, said transmitter node (u) continuously executes successive measurement rounds, wherein each measurement round consists of M measurement periods, wherein each measurement period lasts TM time units and wherein, at the beginning of the m-th measurement period, a m-th broadcast probe packet is sent to a MAC protocol buffer.

According to an embodiment, during a measurement period, said transmitter node (u) broadcasts one probe packet after having switched to the corresponding transmission mode, and may receive one or more probe packets from other nodes while receiving in one or more different receiving modes.

According to another embodiment, when a receiving node (v) receives a broadcast probe packet, it computes a new start time for receiving in a next measurement period using a timestamp in the broadcast probe packet.

Preferably, said receiving node (v) computes its receiving duration for the next measurement period by computing broadcast probe packet transmission durations of its neighbor nodes, the delay for switching to receiving mode, a delay factor to account for MAC protocol delays, an estimate of the maximum clock phase difference between node (v) and its neighbor nodes provided by the timestamps in the probe packets received by the neighbors of node (v) and maximum propagation delay between node (v) and its neighbor nodes.

Advantageously, said receiving node (v) selects the receiving mode to be used in its receiving duration for the next measurement period using the transmission modes that its neighbor nodes will use during the next measurement period. According to an embodiment, said receiving node (v) selects the receiving mode according to specific criteria.

Preferably, said receiving node (v) selects the receiving mode that corresponds to the least recently received transmission/reception mode across its neighbor nodes.

According to an embodiment, said receiving node (v) selects the least recently received transmission/reception mode across its neighbour nodes a limited number of consecutive times in order to avoid repeatedly selecting a non-functioning transmission/reception mode.

Preferably, said receiving node (v) sets a timer to schedule to switch to the selected receiving mode at the previously computed start time for the next measurement period of transmitter node (u).

BRIEF DESCRIPTION OF THE DRAWINGS

The following detailed description will be better understood with the drawings, in which.

DETAILED DESCRIPTION OF THE EMBODIMENTS OF THE INVENTION

Figure 1:
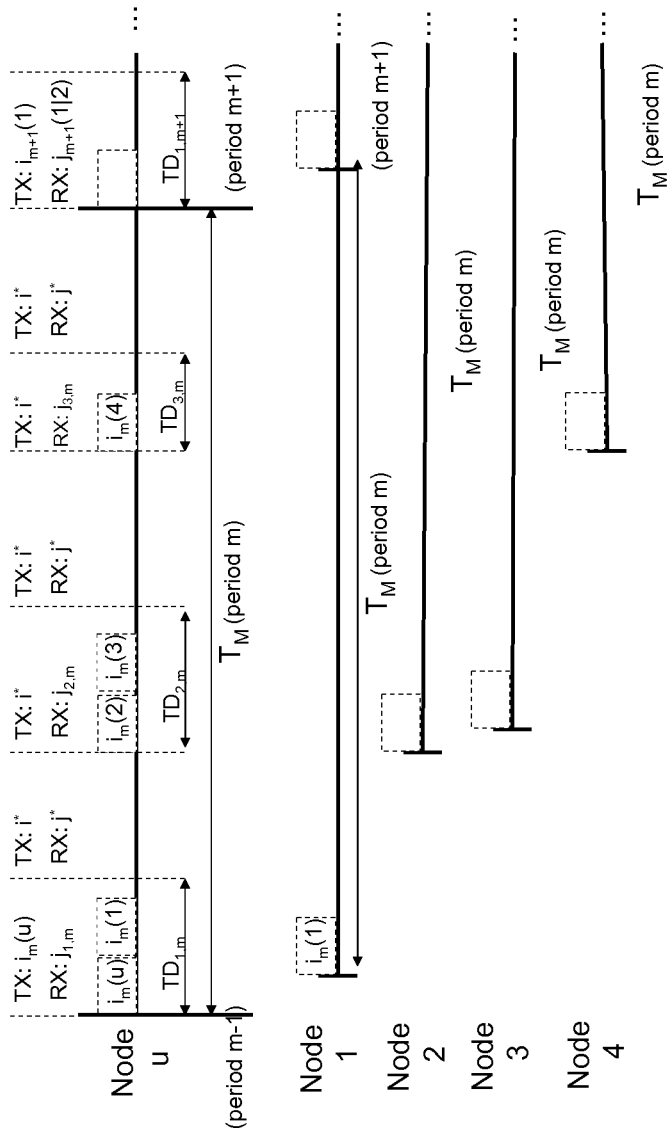
FIG. 1 shows measurement protocol operation at node u with four neighbor nodes during measurement period m.
Figure 2:
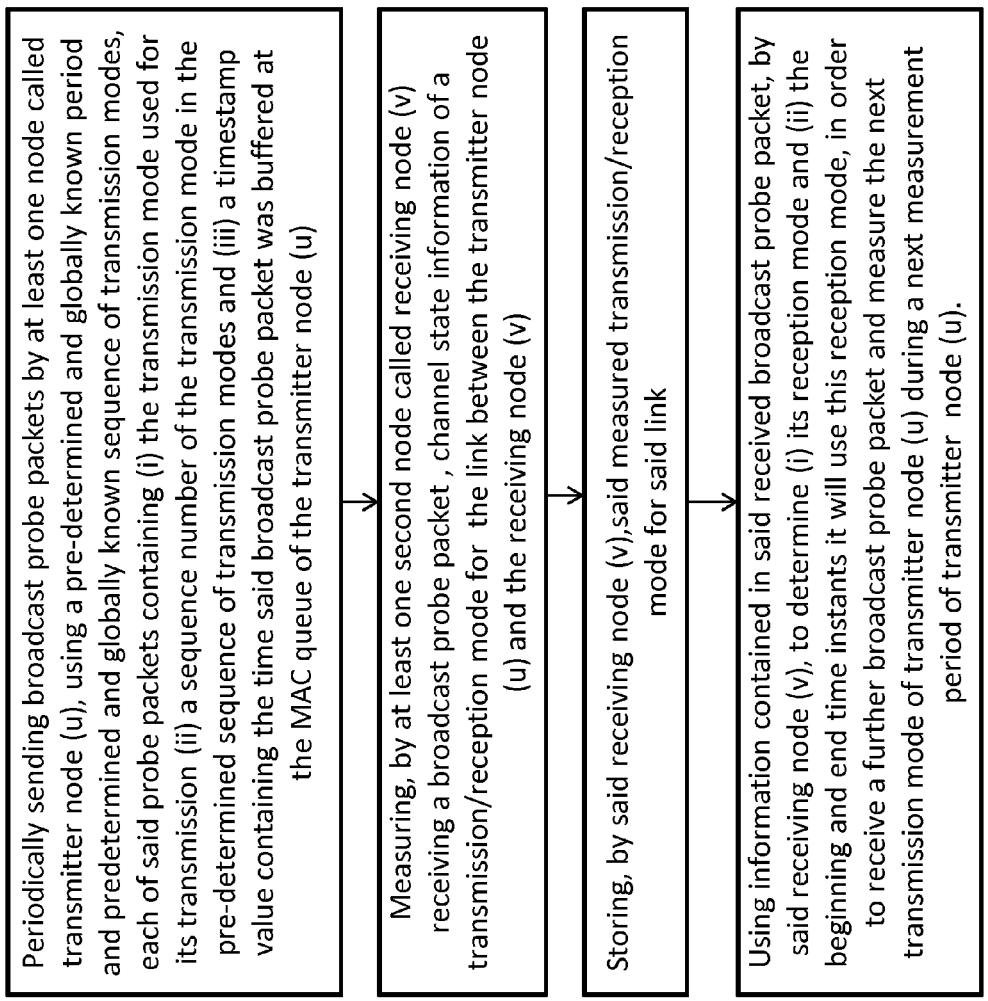
FIG. 2 is a flow-chart representing the method according to the present invention.

The wireless network is represented by a directed graph $G=(V,E)$ where $V$ is a set of $N$ nodes in the network and $E \subseteq V^2$ is a set of uni-directional links between pairs of nodes. More precisely, the link $(u,v) \in E$ exists between node pair u and v, if data can be delivered from u to v with a delivery ratio above a threshold ($PRR_{thresh}$) when the link operates at the lowest bit rate supported by the underlying physical layer. This ensures that each link in the network can carry data using at least one of the possible bit rates. For each node u, we define the set of its neighbor nodes $N(u)$ as all the nodes $v \in V$ for which $(v,u) \in E$, i.e. node u can receive packets from according to the definition above.

The system operates with a set of M Tx/Rx modes $M=\{(i_m, j_m), m=1, \ldots, M\}$, where $i_m$ and $j_m$ take values from the set $K=\{0, 1, \ldots, K\}$. In wireless networks with smart antennas, each Tx/Rx mode corresponds to a distinct antenna pattern on the wireless link, formed when transmitter and receiver use $i_m$ and $j_m$ Tx and Rx antenna patterns respectively. Various smart antenna techniques can be used to form distinct antenna patterns including antenna sectorization, antenna arrays, MIMO beamforming, etc. In wireless networks that operate with multiple frequency channels, each Tx/Rx mode corresponds to a distinct frequency channel. In this case, both transmitter and receiver must tune to the same Tx and Rx mode at the same time in order for successful communication to occur, i.e. $i_m = j_m$ for all Tx/Rx modes in the set M.

We assume that each node has a half-duplex radio transceiver, i.e. at a given time, it can only transmit at a single transmit Tx mode $i_m$ or receive at a single Rx mode $j_m$. A Tx/Rx mode $(i_m, j_m)$ on a link $(u,v) \in E$ is formed when the transmitter uses Tx mode $i_m$ and the receiver uses Rx mode $j_m$. The channel state of each Tx/Rx mode may correspond to Signal-to-Noise ratio (SNR), or Received Signal Strength (RSS) measured at the receiver of each link.

The measurement protocol aims to measure the channel state values $RSS_{uvi_m j_m}$ of all Tx/Rx modes M={$(i_m, j_m)$, m=1, ..., M} for all links (u,v) in the wireless network, We assume that during the time when each node u is not executing the measurement protocol, it operates using a default Tx mode $i^*(u)$ and Rx mode $j^*(u)$.

Before describing the protocol, we first illustrate the idea behind it using an idealized algorithm.

Time is organized in N cycles, where N is the number of nodes in the network. In each cycle a single node u transmits broadcast probe packets and all other nodes v act as receivers. All nodes are synchronized and know the transmission times of the probe packets and which Tx/Rx modes to use during each transmission. Each broadcast probe packet sent by node u and received by a receiver node v results in a channel state (e.g. RSS) measurement for link (u,v). Each cycle consists of M rounds where in the m-th round node u transmits M broadcast packets on Tx modes $i_1, \ldots, i_M$ while all other nodes are tuned to receive in Rx mode $j_m$. Thus, when the system supports packet-level synchronization and under the ideal conditions of no packet losses, the $RSS_{uvi_m j_m}$ of all Tx/Rx modes on all links can be measured using $NM^2$ measurements.

This algorithm can be implemented at the MAC protocol layer of a wireless network using a TDMA MAC protocol. However, translating this algorithm to an operational protocol implemented at a higher layer than the MAC layer entails several challenges. First, if the measurement protocol operates on top of an existing MAC protocol (like IEEE 802.11), no tight synchronization on packet transmission and Tx/Rx mode timings is available. This imposes limitations on coordinating nodes to measure on all Tx/Rx modes. In addition, the protocol should account for probe packet losses and simultaneous and asynchronous transmissions and receptions among different nodes.

The measurement protocol is executed continuously at each node u and aims to measure the channel state values on all Tx/Rx modes M={$(i_m, j_m)$, m=1, ..., M}. During the protocol operation, each node u performs different transmitter and receiver actions, described next.

Transmitter Operation.

As transmitter, each node u continuously executes measurement rounds. Each measurement round consists of M measurement periods. Each measurement period lasts $T_M$ time units (e.g. seconds). At the beginning of the m-th measurement period, the m-th broadcast probe packet is sent to the MAC protocol buffer. Once the probe is at the head of the MAC buffer, the node will attempt to transmit it using the MAC protocol by contending with its neighbor nodes. As a result, during each cycle, M broadcast probe packets are sent at the MAC protocol buffer of node u every $T_M$ seconds. In addition, the packets are sent at a pre-defined Tx mode sequence TXSEQ=($i_1, i_2, \ldots, i_m$). This sequence is an arbitrary (but globally known) ordering of the TX modes {$i_m$} of the set M={$(i_m, j_m)$, m=1, ..., M}.

The parameters M, $T_M$ and TXSEQ are fixed and known to all nodes in the network. These parameters help remove the timing and Tx mode uncertainty at the receivers.

Each probe transmitted by node u informs its neighbor nodes about its own Tx mode and approximate time of arrival of the next probes of node u. More specifically, the m-th probe contains (i) its Tx mode $i_m(u)$ (ii) its sequence number m in TXSEQ, and (iii) a timestamp $t_m(u)$ of the time it was buffered at the MAC queue of transmitter node u (in an implementation at a higher layer than MAC it is only possible to control the buffering time and not the actual transmission time of the probe packet by the MAC). This timestamp aids the neighbors of node u to maintain a coarse clock synchronization with the clock of node u and estimate the time when node u buffer its probe packet during each measurement period. The MAC protocol delay is random and depends on the queuing delays in the node and on the contention with neighbor nodes. The queuing delay can be removed if each probe packet receives highest priority over all other packets of node u, i.e., it is inserted at the head of the MAC buffer. In IEEE 802.11 this can be easily achieved using IEEE 802.11e priority queues or IEEE 802.11a/b/g software drivers such as MadWiFi.

The measurement protocol's probing period $T_M$ should be set much higher than the MAC delay In the 802.11 MAC, the MAC delay is in the order of milli-seconds and $T_M$ should be set in the order of seconds.

Receiver Operation.

As receiver, each node u must coordinate with the timing and antenna patterns of transmitted probes from its neighbor nodes. Let N(u) be the set of neighbors of node u.

Each measurement period m of node u consists of K(u) dwell periods. During each dwell period k, node u expects to receive $N_k$ measurement probes from a subset of the set N(u) of its neighbor nodes. For example, in FIG. 1, node u has N(u)=4 neighbors whose probe packets are partitioned in K(u)=3 dwell periods. The duration $TD_{k,m}$ of each dwell period k of measurement period m of node u consists of (i) the delay for node u to switch to the desired Rx mode $j_{k,m}$ (ii) the packet transmission durations of $N_k$ probes (plus duration of one probe if node u transmits its own probe during this dwell period) (iii) a delay factor to account for MAC protocol delays (iv) an estimate of the clock phase difference between node u and its neighbors in set N(u) provided by the timestamps in the probe packets received by the neighbors of node u. (iv) propagation delay between node u and its neighbors in set N(u).

We now describe the node actions as receiver when it operates with a known set of neighbor nodes N(u) and when it receives the first probe from a neighbor node.

Operation with known set of neighbors. Let sk,m be the start time when node u enters dwell period k and activates Rx mode jk,m for a duration TDk,m. During this dwell period, node u may receive probe packets from one or more nodes v in subset Nk of neighbors of node u. Note that due to potential collisions or wireless channel losses, it is not necessary that all probes in Nk will be received. Let im(v) be the Tx mode in the probe received by each node v during this dwell period.

At the end of the dwell period (i.e. at time instant $s_{k,m} + TD_{k,m}$), node u performs the following steps.

Step 1: For each received probe of each node v, node u extracts the channel state value RSS(v) and uses it to update a moving average estimate $RSS_{uvi_m j_{k,m}}$.

$$RSS_{uvi_m j_{k,m}} = \alpha \cdot RSS_{uvi_m j_{k,m}} + (1-\alpha) \cdot RSS(v)$$

where $\alpha$ is a system parameter.

Step 2: In a perfectly synchronized network the start time $s_{k,m+1}$ of the next dwell period k of node u should begin after time $T_M$: $s_{k,m+1}=s_{k,m}+T_M$. However, the node clocks may drift and some neighbors in set $N_k$ with slower clocks that have drifted may start earlier in the next period and miss this $s_{k,m+1}$. Thus, node u adjusts the start time $S_{k,m+1}$ of the dwell period k of its next measurement period m+1, based on the received probe packets. Using the timestamps $t_m(v)$ in the probe packets, node u first updates its clock phase difference with nodes v in $N_k$. Then, it computes the times $s_{k,m}(v)$ where these nodes buffered their probes during period m (according to its own time reference). Then, the $s_{k,m+1}$ is updated as follows:

$$s_{k,m+1} = \min\left(s_{k,m} + T_M, \min_{v \in N_k}(s_{k,m}(v) + T_M)\right)$$

Similarly node u adjusts the end of the next dwell period k based on the latest buffer times by updating the duration dwell period $TD_{k,m+1}$ as:

$$TD_{k,m+1} = T_D + D_{max},$$

where $T_D$ accounts for the packet transmission durations of $N_k$ probes (plus duration of one probe if node u transmits its own probe during this dwell period) and $D_{max}$ includes (i) the delay for node u to switch to the desired Rx mode $j_{k,m+1}$ during this dwell period (ii) a delay factor to account for MAC protocol delays (iii) estimate of the maximum clock phase difference between node u and its neighbors in set $N_k$ provided by the timestamps in the probe packets received by the neighbors of node u in set $N_k$. (iv) maximum propagation delay between node u and its neighbors in set $N_k$.

These updates ensure that the dwell period k of period m+1 starts earlier than the MAC buffering times of the nodes in $N_k$ and includes all subsequent probe transmissions. This ensures that no probe packets are lost due to clock drifts between node u and its neighbor nodes.

Step 3: Node u selects its Rx mode $j_{k,m+1}$ of dwell period k during measurement period m+1. Due to the global sequence TXSEQ, node u knows the next Tx modes $i_{m+1}(v)$ of the nodes v in $N_k$. Based on this information node v can select $j_{k,m+1}$ based on various optimization criteria. One criterion of interest is ensuring that all Tx/Rx modes are eventually measured. In this case, node u selects the antenna pattern $j_{k,m+1}=j$ that corresponds to its least recently received Tx/Rx mode $(i_{m+1}(v), j)$, across all nodes v in $N_k$. This selection can be implemented using a queue of $N_k \times M$ elements $\{(v, i_m, j_m), m=1, \ldots, M, v=1, \ldots, N_k\}$ which contains all Tx/Rx modes corresponding to the neighbors of node u in $N_k$. The element at the head of this queue will be the least recently used element in the list and node u will be tuned to the Rx mode $j_m$ corresponding to this element. Each time a probe at Tx mode $i_m$, is received from node v when u is at Rx mode $j_m$, the element $(v, i_m, j_m)$ is "pushed" at the end of the queue.

Step 4: Node u schedules a timer to enter dwell period k of measurement period m+1 at Rx mode $j_{k,m+1}=j$ based on the computed $s_{k,m+1}$ and $TD_{k,m+1}$.

FIG. 1 shows measurement protocol operation at node u with four neighbor nodes during measurement period m. By default, we assume that node u uses Tx mode i* and Rx mode j*. At the beginning of the measurement period, node u transmits a probe packet at Tx mode $i_m(u)$. When it enters dwell period k, it is tuned to receive to Rx mode $j_{k,m}(u)$.

Reception of first probe. When node u receives a probe packet from a neighbor node v for the first time, it determines the Tx modes and (approximate) MAC buffering times of future probe packets of v, based on M, $T_M$, TXSEQ and the contents of the probe packet. More specifically, node u, associates node v with one dwell period within its current measurement period. If the probe packet was received during an existing dwell period, node u associates node v with this period and extends this dwell period by the packet duration of the received probe. If the probe packet is received during a time instant that does not belong to an existing dwell period, then node u creates a new dwell period for node v. The computation of the start time and duration of the dwell period are updated in a similar manner to "Step 2" of "Operation with known set of neighbors" section above.

We now introduce four methods to reduce the measurement complexity for the case where the Tx/Rx modes are implemented using multi-sector antennas. In this case, measuring all antenna patterns for each link requires a number of measurements that grows exponentially with the number of sectors. If each antenna has s sectors then the maximum number of Tx or Rx patterns is $2^s-1$, giving a maximum number of Tx/Rx modes $M=(2^s-1)^2$. We consider four methods, three of which measure only a subset of all antenna patterns and predict the rest using simple models. The methods provide decreased measurement complexity at the potential cost of loss in accuracy.

Method 1. $M=(2^{s-1})^2$ measurements per link and no predictions.

Method 2. $M=s^2$ measurements per link. This method predicts the channel state (RSS) of multi-sector patterns of each node based only on measurements of single-sector patterns. More specifically, for a given set of sectors, the RSS of their multi-sector pattern is approximated by the maximum RSS of the measured single-sector patterns. This method ignores multi-path reflections and assumes that sector combinations are super-impositions of the individual sectors.

In the measurement protocol, each probe train need to contain $M=s^2$ probes sent only at single-sector or omni patterns.

Method 3. $M=2s+1$ measurements per link. This method requires measurements only at omni-mode $RSS_{uv00}$ and all single sector combinations at transmitter $RSS_{uvi0}$ side and receiver side $RSS_{uv0j}$. Based on these values, the RSS of any antenna pattern on each link $RSS_{uvij}$ is given by:

$$RSS_{uvij} = RSS_{uv00} - ((RSS_{uv00} - RSS_{uv0j}) + (RSS_{uv00} - RSS_{uvi0}))$$

In the measurement protocol, each probe train need to contain $M=2s+1$ probes sent only at single-sector and omni patterns.

Method 4. $M=s$ measurements per link. This method assumes reciprocity, i.e. that the send gain of the antenna pattern equals the receive gain of the antenna pattern, i.e. $RSS_{uvij}=RSS_{uvji}$.

All methods work with the measurement protocol simply by replacing M with the appropriate number of measurements and having nodes being aware of which sector patterns they need to measure.

The above specification, examples and drawings provide a complete description of the method according to the present invention. Since many embodiments of the invention can be made without departing from the spirit and scope of the invention, the invention resides in the claims herein after appended.

The invention claimed is:

1. A method for measuring channel state information of multiple communication modes in a multi-mode wireless network comprising a plurality of nodes, the method comprising:
receiving a broadcast probe packet during a measurement period at a first node of said plurality of nodes from a second node of said plurality of nodes using a period and sequence of communication modes, wherein a communication mode is related to a transmission mode or a reception mode for a node of said plurality of nodes and is defined by at least a frequency channel and an antenna pattern, and wherein said broadcast probe packet comprises information including:
  (i) an identification of a particular communication mode used for transmission of the broadcast probe packet from the second node;
  (ii) a sequence number of the particular communication mode in the sequence of communication modes; and
  (iii) a timestamp value representing a time at which said broadcast probe packet was buffered at a MAC queue included in the second node;
measuring, by the first node, channel state information for communication mode used in connecting the second node and the first node;
storing, by said first node, said measured channel state information for the communication mode used in connecting the first and second nodes;
determining, by said first node, the communication mode for the first node using said information in said received broadcast probe packet; and
determining a time during which said first node will use the determined communication mode in order to receive a subsequent broadcast probe packet from said second node during a next measurement period of said second node using said timestamp value from said received broadcast probe packet.

2. The method according to claim 1, wherein the plurality of nodes are capable of transmitting and receiving, wherein said transmitting by a node of the plurality includes transmitting a broadcast probe packet in accordance with a first defined communication mode, and wherein said receiving by a node of the plurality includes receiving, from neighboring nodes of the first node during a measurement period, at least one broadcast probe packet in in accordance with a second defined communication.

3. The method according to claim 1, wherein, at any one time, a node of said plurality of nodes is capable of performing one of: transmitting the broadcast probe packet in accordance with a communication mode, or receiving the broadcast probe packet in accordance with a communication mode.

4. The method according to claim 1, wherein said channel state information is one of Received Signal Strength or Signal-to-Noise ratio.

5. The method according to claim 1, wherein said second node continuously executes successive measurement rounds, wherein each measurement round consists of M measurement periods, wherein each measurement period lasts TM time units and wherein, at the beginning of the m-th measurement period, an m-th broadcast probe packet is sent to a MAC protocol buffer associated with the second node.

6. The method according to claim 5, wherein, during a measurement period, said second node broadcasts one broadcast probe packet after having switched to the communication mode identified in said broadcast probe packet, and said second node is capable of receiving one or more broadcast probe packets from neighboring nodes of the first node in accordance with one or more different communication modes.

7. The method according to claim 1, wherein the method further includes, in response to receiving a broadcast probe packet at the first node, computing a new start time for receiving in a next measurement period using the timestamp in the broadcast probe packet.

8. The method according to claim 7, wherein the method further includes, determining, by the first node, a receiving duration for the next measurement period by computing:
  broadcast probe packet transmission durations for neighboring nodes of the first node,
  delay for switching to a communication mode,
  a delay factor to account for MAC protocol delay, and
  an estimate of a maximum clock phase difference between the first node and the neighboring nodes in the network based on the timestamps in the broadcast probe packets received by the neighboring nodes and maximum propagation delay between the first node and the neighboring nodes.

9. Receiver apparatus in a first node of a multi-mode wireless network comprising a plurality of nodes for measuring channel state information of multiple communication modes, the receiver apparatus including a memory and a processor in communication with said memory;
the processor capable of measuring channel state information of multiple communication modes in said wireless network by: receiving a broadcast probe packet during a measurement period from a second node of said plurality of nodes using a period and sequence of communication modes, wherein a communication mode is related to a transmission mode or a reception mode for a node of said plurality of nodes and is defined by at least a frequency channel and an antenna pattern, and wherein said broadcast probe packet comprises information including:
  (i) an identification of a particular communication mode used for transmission of the broadcast probe packet from the second node;
  (ii) a sequence number of the particular communication mode in the sequence of communication modes; and
  (iii) a timestamp value representing a time at which said broadcast probe packet was buffered at a MAC queue included in the second node;
measuring channel state information for the communication mode used in connecting the second node and the first node; storing in the memory said measured channel state information for the communication mode used in connecting the first and second nodes; determining the communication mode for the first node using said information in said received broadcast probe packet; and determining a time during which said first node will use the determined communication mode in order to receive a subsequent broadcast probe packet from said second node during a next measurement period of said second node using said timestamp value from said received broadcast probe packet.

10. The receiver apparatus according to claim 9, wherein the plurality of nodes are capable of transmitting and receiving, wherein said transmitting by a node of the plurality includes transmitting a broadcast probe packet in accordance with a first defined communication mode, and wherein said receiving by a node of the plurality includes receiving, from neighboring nodes of the first node during a measurement period, at least one broadcast probe packet in in accordance with a second defined communication mode.

11. The receiver apparatus according to claim 9, wherein, at any one time, a node of said plurality of nodes is capable of performing one of: transmitting the broadcast probe packet in accordance with a communication mode, or receiving the broadcast probe packet in accordance with a communication mode.

12. The receiver apparatus according to claim 9, wherein said channel state information is one of Received Signal Strength or Signal-to-Noise ratio.

13. The receiver apparatus according to claim 9, wherein said second node continuously executes successive measurement rounds, wherein each measurement round consists of M measurement periods, wherein each measurement period lasts TM time units and wherein, at the beginning of the m-th measurement period, an m-th broadcast probe packet is sent to a MAC protocol buffer associated with the second node.

14. The receiver apparatus according to claim 13, wherein, during a measurement period, said second node broadcasts one broadcast probe packet after having switched to the communication mode identified in said broadcast probe packet, and said second node is capable of receiving one or more broadcast probe packets from neighboring nodes of the first node in accordance with one or more different communication modes.

15. The receiver apparatus according to claim 9, wherein the processor is further capable of measuring by computing, in response to receiving a broadcast probe packet at the first node, a new start time for receiving in a next measurement period using the timestamp in the broadcast probe packet.

16. The receiver apparatus according to claim 15, wherein the processor is further capable of measuring by determining, by the first node, a receiving duration for the next measurement period by computing:
broadcast probe packet transmission durations for neighboring nodes of the first node,
delay for switching to a communication mode,
a delay factor to account for MAC protocol delay, and
an estimate of a maximum clock phase difference between the first node and the neighboring nodes in the network based on the timestamps in the broadcast probe packets received by the neighboring nodes and maximum propagation delay between the first node and the neighboring nodes.

17. Receiver apparatus in a first node of a multi-mode wireless network comprising a plurality of nodes for measuring channel state information of multiple communication modes, the receiver apparatus including an antenna and a processor in communication with said antenna;
the processor capable of measuring channel state information of multiple communication modes in said wireless network by: receiving, using said antenna, a broadcast probe packet during a measurement period from a second node of said plurality of nodes using a period and sequence of communication modes, wherein a communication mode is related to a transmission mode or a reception mode for a node of said plurality of nodes and is defined by at least a frequency channel and an antenna pattern, and wherein said broadcast probe packet comprises information including:
(i) an identification of a particular communication mode used for transmission of the broadcast probe packet from the second node;
(ii) a sequence number of the particular communication mode in the sequence of communication modes; and
(iii) a timestamp value representing a time at which said broadcast probe packet was buffered at a MAC queue included in the second node;
measuring channel state information for the communication mode used in connecting the second node and the first node;
storing said measured channel state information for the communication mode used in connecting the first and second nodes; determining the communication mode for the first node using said information in said received broadcast probe packet; and determining a time during which said first node will use the determined communication mode in order to receive a subsequent broadcast probe packet from said second node during a next measurement period of said second node using said timestamp value from said received broadcast probe packet.

18. The receiver apparatus according to claim 17, wherein the plurality of nodes are capable of transmitting and receiving, wherein said transmitting by a node of the plurality includes transmitting a broadcast probe packet in accordance with a first defined communication mode, and wherein said receiving by a node of the plurality includes receiving, from neighboring nodes of the first node during a measurement period, at least one broadcast probe packet in in accordance with a second defined communication mode.

19. The receiver apparatus according to claim 17, wherein, at any one time, a node of said plurality of nodes is capable of performing one of: transmitting the broadcast probe packet in accordance with a communication mode, or receiving the broadcast probe packet in accordance with a communication mode.

20. The receiver apparatus according to claim 17, wherein said channel state information is one of Received Signal Strength or Signal-to-Noise ratio.

21. The receiver apparatus according to claim 17, wherein said second node continuously executes successive measurement rounds, wherein each measurement round consists of M measurement periods, wherein each measurement period lasts TM time units and wherein, at the beginning of the m-th measurement period, an m-th broadcast probe packet is sent to a MAC protocol buffer associated with the second node.

22. The receiver apparatus according to claim 21, wherein, during a measurement period, said second node broadcasts one broadcast probe packet after having switched to the communication mode identified in said broadcast probe packet, and said second node is capable of receiving one or more broadcast probe packets from neighboring nodes of the first node in accordance with one or more different communication modes.

23. The receiver apparatus according to claim 17, wherein the processor is further capable of measuring by computing, in response to receiving a broadcast probe packet at the first node, a new start time for receiving in a next measurement period using the timestamp in the broadcast probe packet.

24. The receiver apparatus according to claim 23, wherein the processor is further capable of measuring by determining, by the first node, a receiving duration for the next measurement period by computing:
broadcast probe packet transmission durations for neighboring nodes of the first node,
delay for switching to a communication mode,
a delay factor to account for MAC protocol delay, and
an estimate of a maximum clock phase difference between the first node and the neighboring nodes in the network based on the timestamps in the broadcast probe packets received by the neighboring nodes and maximum propagation delay between the first node and the neighboring nodes.

\* \* \* \* \*